United States Patent
Greenberger et al.

(10) Patent No.: US 10,614,710 B2
(45) Date of Patent: *Apr. 7, 2020

(54) MAP DISPLAY WITH DIRECTIONS GENERATING AND DOWNLOAD FACILITY

(71) Applicant: INTERNATIONAL BUSINESS MACHINES CORPORATION, Armonk, NY (US)

(72) Inventors: Jeremy A. Greenberger, San Jose, CA (US); Trudy L. Hewitt, Cary, NC (US); Jana H. Jenkins, Raleigh, NC (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/955,880

(22) Filed: Apr. 18, 2018

(65) Prior Publication Data

US 2018/0233043 A1 Aug. 16, 2018

Related U.S. Application Data

(63) Continuation of application No. 15/414,836, filed on Jan. 25, 2017, now Pat. No. 10,043,387.

(51) Int. Cl.
*G08G 1/0968* (2006.01)
*G01C 21/36* (2006.01)
*G08G 1/0967* (2006.01)

(52) U.S. Cl.
CPC ..... *G08G 1/096816* (2013.01); *G01C 21/362* (2013.01); *G01C 21/3611* (2013.01);
(Continued)

(58) Field of Classification Search
CPC ....... G08G 1/096816; G08G 1/096811; G08G 1/0968; G08G 1/096775; G01C 21/3664;
(Continued)

(56) References Cited

U.S. PATENT DOCUMENTS 6,708,111 B2  3/2004  Park
6,973,318 B2  12/2005  Jambhekar et al.
(Continued)

FOREIGN PATENT DOCUMENTS

WO  WO2007097548 A1  8/2001

OTHER PUBLICATIONS

Wen Wu et al., "A Multimedia System for Route Sharing and Video-based Navigation", IEEE International Conference on Multimedia and Expo. Jul. 9-12, 2006, (pp. 73-76).
(Continued)

*Primary Examiner* — Dale W Hilgendorf
(74) *Attorney, Agent, or Firm* — Michael A. Petrocelli, Esq.; Kevin P. Radigan, Esq.; Heslin Rothenberg Farley & Mesiti P.C.

(57) ABSTRACT

A map-display-based, computer-implemented approach is provided for providing directions to a user to assist the user in reaching a destination. The approach includes, for instance, collecting at a map display user input data, where the user input data includes the user's destination. In addition, the approach includes generating, by a directions generating facility associated with the map display, directions for the user to use in navigating from a current location to the user's destination, and downloading the directions generated by the directions generating facility to a mobile device of the user to assist the user in reaching the desired destination after leaving the map display. The downloading
(Continued)

of directions to the user's mobile device may include downloading the directions in at least one of text data format or voice data format.

16 Claims, 9 Drawing Sheets

(52) U.S. Cl.
CPC ..... *G01C 21/3629* (2013.01); *G01C 21/3664* (2013.01); *G08G 1/0968* (2013.01); *G08G 1/096775* (2013.01); *G08G 1/096811* (2013.01)

(58) Field of Classification Search
CPC .............. G01C 21/362; G01C 21/3629; G01C 21/3614
See application file for complete search history.

(56) References Cited

U.S. PATENT DOCUMENTS

| | | | |
|---|---|---|---|
| 8,352,178 | B2 | 1/2013 | Allen et al. |
| 8,510,045 | B2 | 8/2013 | Rueben et al. |
| 8,712,688 | B2 | 4/2014 | Forte et al. |
| 8,866,673 | B2 | 10/2014 | Mendelson |
| 9,247,053 | B1 | 1/2016 | Bruce et al. |
| 9,417,074 | B2 | 8/2016 | Leader et al. |
| 9,940,663 | B2 | 4/2018 | Ward et al. |
| 10,043,387 | B1 * | 8/2018 | Greenberger et al. ........................ G08G 1/096816 |
| 2008/0301102 | A1 * | 12/2008 | Liang .................... G06Q 10/08 705/26.1 |
| 2010/0030585 | A1 | 12/2010 | Eger |
| 2018/0233044 | A1 * | 8/2018 | Greenberger et al. ........................ G08G 1/096816 |

OTHER PUBLICATIONS

Anonymous, "On-demand Location-based Traffic Congestion Detection and Alternate Route Computation for Smarter Transportation", IP.com No. IPCOM000211227D, Sep. 28, 2011, (3 pages).

Anonymous, "Smart Digital City Map Guide System", IP.com No. IPCOM000212689D, Nov. 23, 2011, (5 pages).

Anonymous, "A Method for Social Collaborative Navigation in a Dynamic Environment", IP.com No. IPCOM000215796D, Mar. 12, 2012, (4 pages).

Hicks, "Smart Paper That Can React To Your Gestures", www.forbes.com/sites/jenniferhicks/2016/05/30/smart-paper-that-can-react-to-your-gestures/#650fa80c3cc8, May 30, 2016, (2 pages).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

Mel, Peter and Tim Grance, "The NIST Definition of Cloud Computing," National Institute of Standards and Technology, Information Technology Laboratory, Special Publication 800-145, Sep. 2011, pp. 1-7.

Greenberger et al., "Map Display with Directions Generating and Download Facility", U.S. Appl. No. 15/414,836, filed Jan. 25, 2017 (42 pages).

Greenberger et al. "Map Display with Directions Generating and Download Facility", U.S. Appl. No. 15/955,897, filed Apr. 18, 2018 (42 pages).

Greenberger et al., "List of IBM Patents and Patent Applications Treated as Related", U.S. Appl. No. 15/955,880, filed Apr. 18, 2018, dated Apr. 18, 2018 (2 pages).

* cited by examiner

MAP DISPLAY WITH DIRECTIONS GENERATING AND DOWNLOAD FACILITY

BACKGROUND

When traveling to a new location, a traveler may find it difficult to navigate the local area. Depending on the region, a person may not even speak the local language. In many areas, physical street maps are provided to assist visitors. However, after looking at a street map, a visitor may not be able to remember every detail because of the number of streets, blocks, etc., to be crossed from the current location to the destination. With a mobile device, an individual may take a photograph of the street map, but the person would need to continually view the photograph on their mobile device in order to navigate. Sometimes, when the physical map is too large, the user's device camera may not even be able to capture the map completely, or clearly.

This is even more challenging for individuals who may be vision impaired. Braille may be indicated on a physical map in some places, but depending on the destination, it may still be difficult for a vision impaired user to remember all the map details after reading the Braille map.

Additionally, if a person is in a location where there is no service signal for the individual's mobile device, then it may not be possible to access the Internet to download local map information or directions to the individual's mobile device. The individual could download a local map on to their mobile device before traveling to those places, but the chosen downloaded map may not work well once there. For instance, there may be multiple local electronic maps available, but a person may not know which map may be most helpful at some time in the future.

SUMMARY

The shortcomings of the prior art are overcome and additional advantages are provided through the provision of a computer-implemented method, which includes collecting at a map display user input data. The user input data collected includes a user's destination, and the computer-implemented method further includes generating, by a directions generating facility associated with the map display, directions for the user to use in navigating from a current location to the user's destination. Additionally, the method includes downloading the directions generated by the directions generating facility to a mobile device of the user to assist the user in navigating to the user's destination. Further, the map display may include multiple data collection modes for the user to input the user input data, and the collecting may include collecting the user input data using at least two data collection modes of the multiple data collection modes. The multiple data collection modes may include user gestures in relation to the map display, user contact with the map display, user eye gaze in relation to the map display, user facial movements in relation to the map display, user head movements in relation to the map display, and user voice recognition.

In another aspect, a system for facilitating providing directions to a user is provided. The system includes a memory, and a processing circuit communicatively coupled to the memory. The system performs a method, including collecting at a map display user input data. The user input data collected includes a user's destination, and the method further includes generating by a directions generating facility associated with the map display, directions for the user to use in navigating from a current location to the user's destination. Additionally, the method includes downloading the directions generated by the directions generating facility to a mobile device of the user to assist the user in navigating to the user's destination. Further, the map display may include multiple data collection modes for the user to input the user input data, and the collecting may include collecting the user input data using at least two data collection modes of the multiple data collection modes. The multiple data collection modes may include user gestures in relation to the map display, user contact with the map display, user eye gaze in relation to the map display, user facial movements in relation to the map display, user head movements in relation to the map display, and user voice recognition.

In a further aspect, a computer program product for facilitating providing directions to a user is provided. The computer program product includes a computer readable storage medium readable by a processing circuit and storing instructions for execution by the processing circuit for performing a method. The method includes: collecting at a map display user input data, the user input data including a user's destination, and generating, by a directions generating facility associated with the map display, directions for the user to use in navigating from a current location to the user's destination. The method further includes downloading the directions generated by the directions generating facility to a mobile device of the user to assist the user in navigating to the user's destination after leaving the map display. Further, the map display may include multiple data collection modes for the user to input the user input data, and the collecting may include collecting the user input data using at least two data collection modes of the multiple data collection modes. The multiple data collection modes may include user gestures in relation to the map display, user contact with the map display, user eye gaze in relation to the map display, user facial movements in relation to the map display, user head movements in relation to the map display, and user voice recognition.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, note that known protocols, structures and techniques have not been shown in detail in order not to obscure the invention. Those of ordinary skill in the art will appreciate that the described techniques and mechanisms may be applied to various systems to facilitate providing directions for download to a user's mobile device, in accordance with one or more aspects of the present invention.

There currently exist a variety of portable computing devices (i.e., mobile devices), including wireless computing devices, such as mobile telephones, personal digital assistance (PDA's), tablets, laptop computers, wireless computers, glasses, etc., which are small, lightweight and easily carried or worn by a user. These mobile devices (including cellular phones, internet protocol (IP) telephones, smartphone devices, etc.) can receive, and communicate, audio and data packets over wireless networks. In addition, in certain implementations, mobile devices may possess facilities which allow for the tracking of the devices, such as by the Global Positioning System (GPS).

As noted, when traveling there are a number of instances when an individual's mobile device may be unable to assist the person in navigating from a current location to a desired location. In view of this, there remains a need for a facility to translate and record just-in-time routing information to a user's mobile device dynamically, for instance, based on information the user provides and gains in a local context, such as when standing before a local map display.

Generally stated, disclosed herein is a facility to dynamically translate local physical street map information for download to a user's mobile device dynamically as the user is standing in front of the local street map or map display. As explained further below, the facility includes capturing or collecting user input data in front of the map display by one or more of a variety input modes. For instance, the map display may have an associated touch screen, or itself be a touch screen display map, which allows a user to contact the map to identify, for instance, a current location, a destination, as well as (if desired) a route for the user to take. This approach could be used for both vision impaired and non-vision impaired users. Additionally, or alternatively, user gestures, such as hand or arm gestures in front of the map display may be used as pointers to different spots on the map display to determine the origin, destination, and/or desired travel route. The route information is automatically converted to at least one of text data format or voice data format, and then downloaded to the user's mobile device wirelessly, for instance, using Bluetooth™ technology, or other wireless data transfer protocol such as WI-FI™ or Near Field Communication (NFC). Note that the concepts presented could also be applied to other applications as well, such as pointing out the steps in a diagram, and rendering the directions to the user's mobile device.

Figure 1:
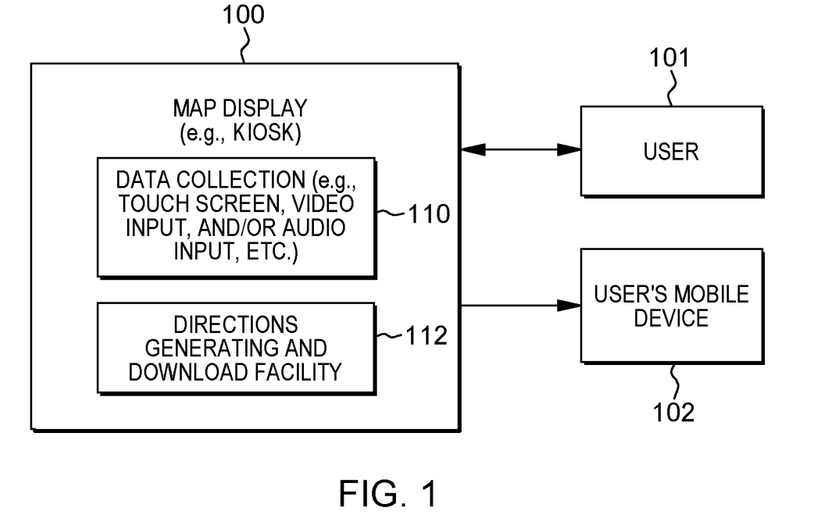
FIG. 1 depicts one embodiment of a map display with a directions generating and download facility, in accordance with one or more aspects of the present invention.

FIG. 1 depicts one embodiment of a map display 100, in accordance with one or more aspects of the present invention. As depicted, a user 101 with a mobile device 102 may, for instance, stand in front of the map display 100 to obtain directional information on how to navigate from the user's current location to the user's desired destination. As illustrated, in one or more embodiments, map display 100 may be implemented as or within a kiosk, and be configured to provide a local downloadable set of directions to users on how to travel or navigate from, for instance, the location of the kiosk to their desired destination. In one or more implementations, map display 100 includes, by way of example, a data collection facility 110, as well as a directions generating and download facility 112. Data collection facility 110 may include various data collection modes and associated components, such as a touch screen, as well as different video and/or audio input capabilities to allow a user to interface or interact with map display 100 in order to obtain a desired set of directions for download to the user's mobile device. As explained further herein, various elements of map display 100, including the data collection facility, and the directions generating and download facility 112 may be computer-implemented, in one or more aspects.

Figure 2A:
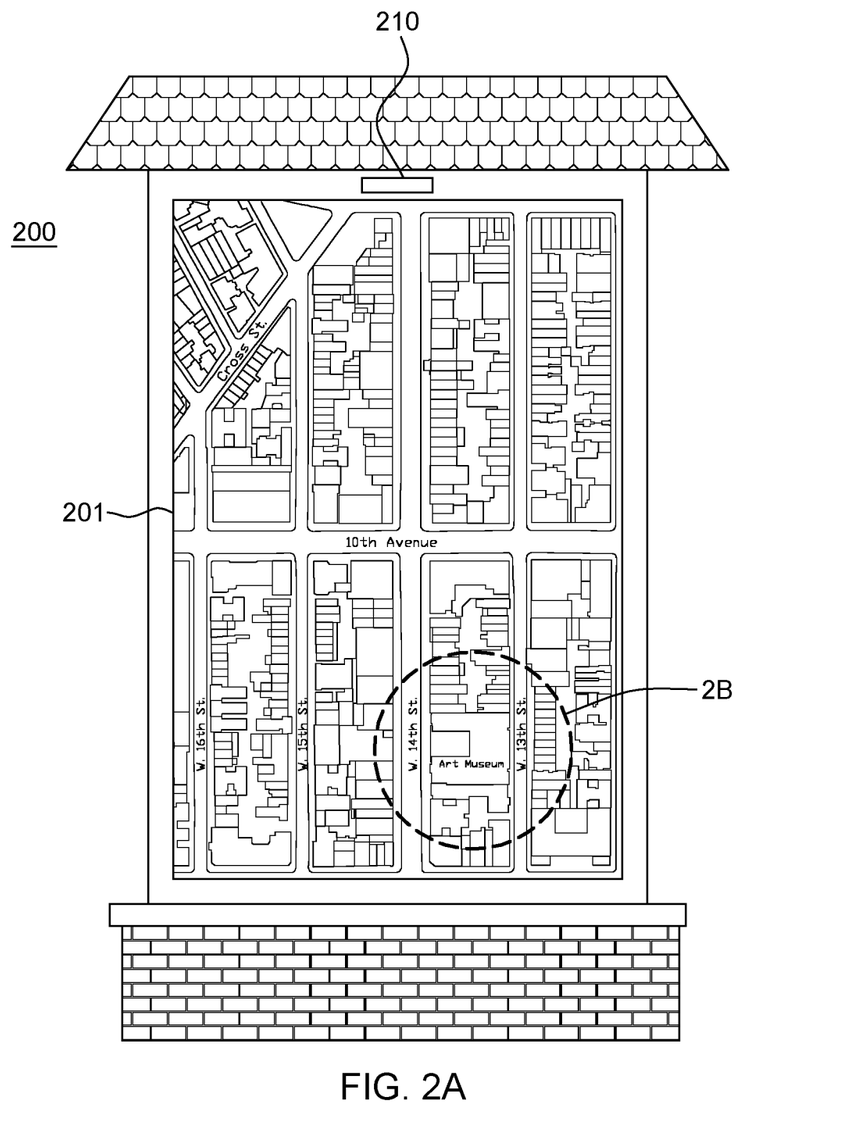
FIGS. 2A-2C depict different examples of a map display with a directions generating facility, in accordance with one or more aspects of the present invention.
Figure 2B:
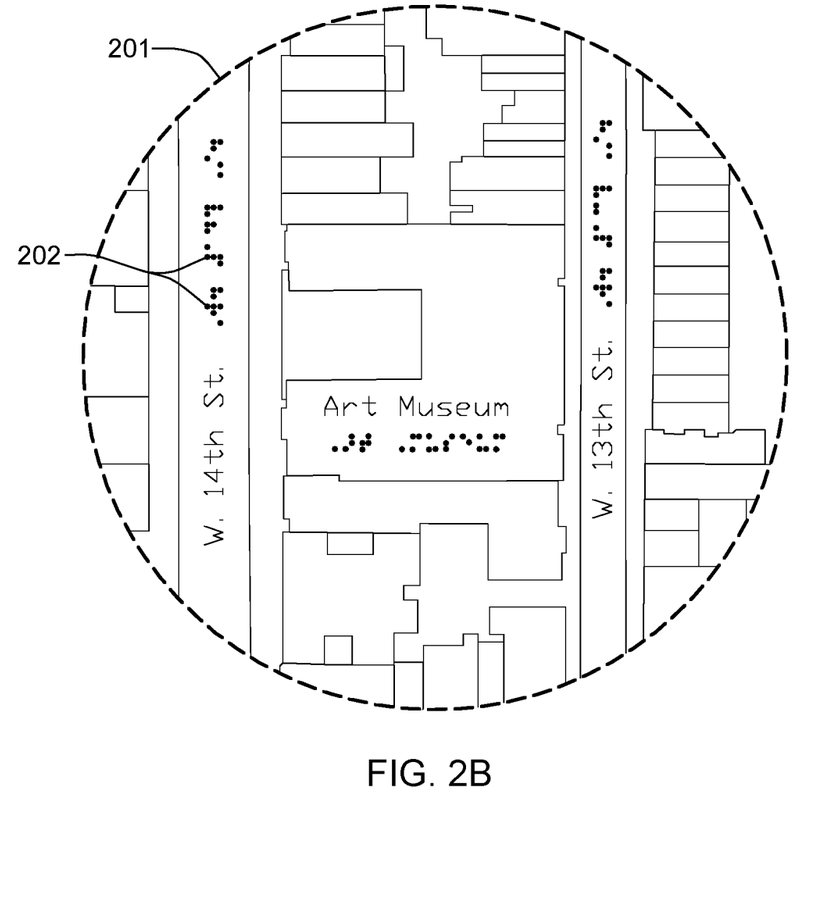
Figure 2C:
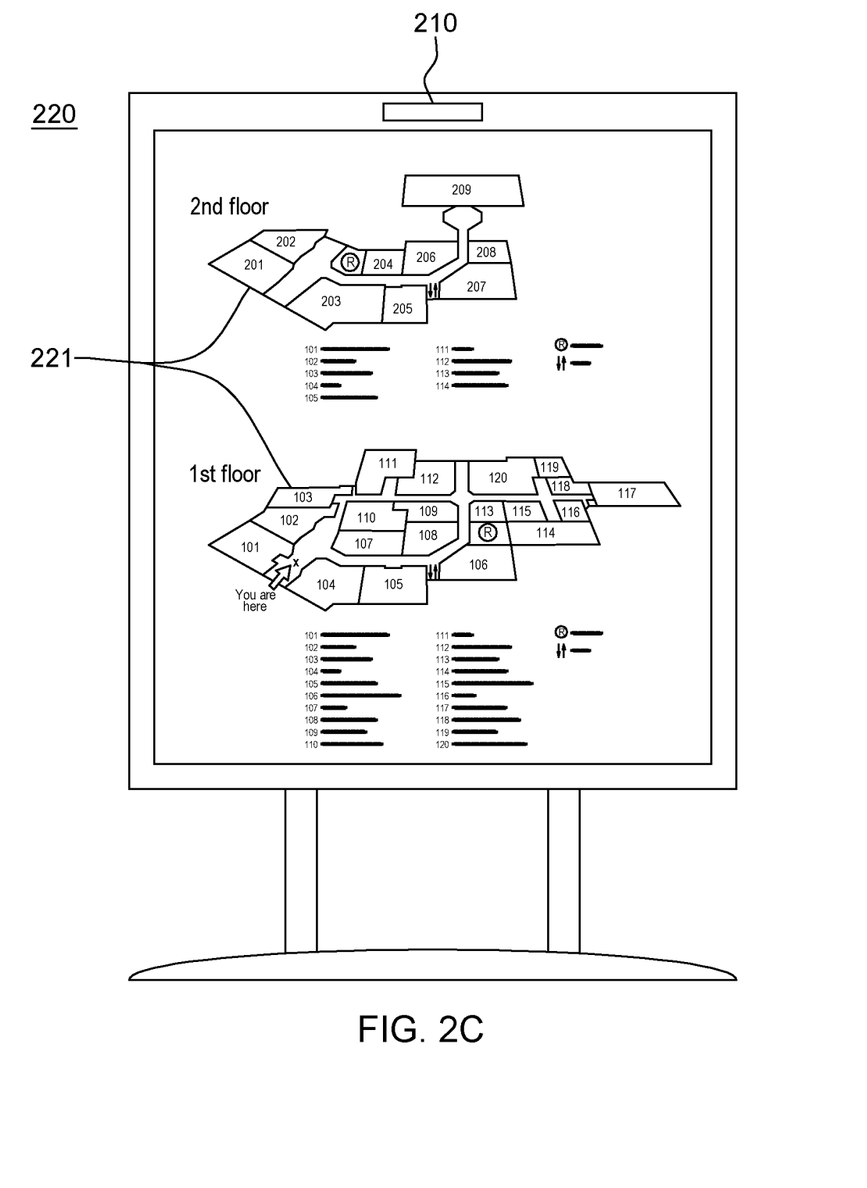

FIGS. 2A-2C depict different examples of a kiosk-implemented, map display with an associated directions generating and download facility, in accordance with one or more aspects of the present invention. As illustrated in FIGS. 2A & 2B, a kiosk 200 may include a map display 201, which may be, in one or more implementations, a street map. As explained herein, one or more interfaces 210 may be provided to allow a visitor to interface with the map display to have directions generated to download to the user's mobile device while the user is standing in front of the map display. As illustrated in FIG. 2B, the map display may include, in one or more implementations, both text and Braille 202 to allow both non-vision impaired and vision impaired users to download directions. In FIG. 2C, another embodiment of a kiosk 220 is shown with a map display 221 depicting different floors of, for instance, a shopping mall. In this scenario, a user may be on one floor of a shopping mall and wish to navigate to another floor and the directions generating facility described herein provides an efficient travel route for the user to take to reach the user's destination. Again, one or more interfaces 210 are provided as described herein to allow the system to collect user input data to assist in the generating, by the directions generating facility, directions for the user to use in navigating from the current location to the user's destination. In each embodiment, the map display also includes or has associated therewith a download capability as described.

Figure 3:
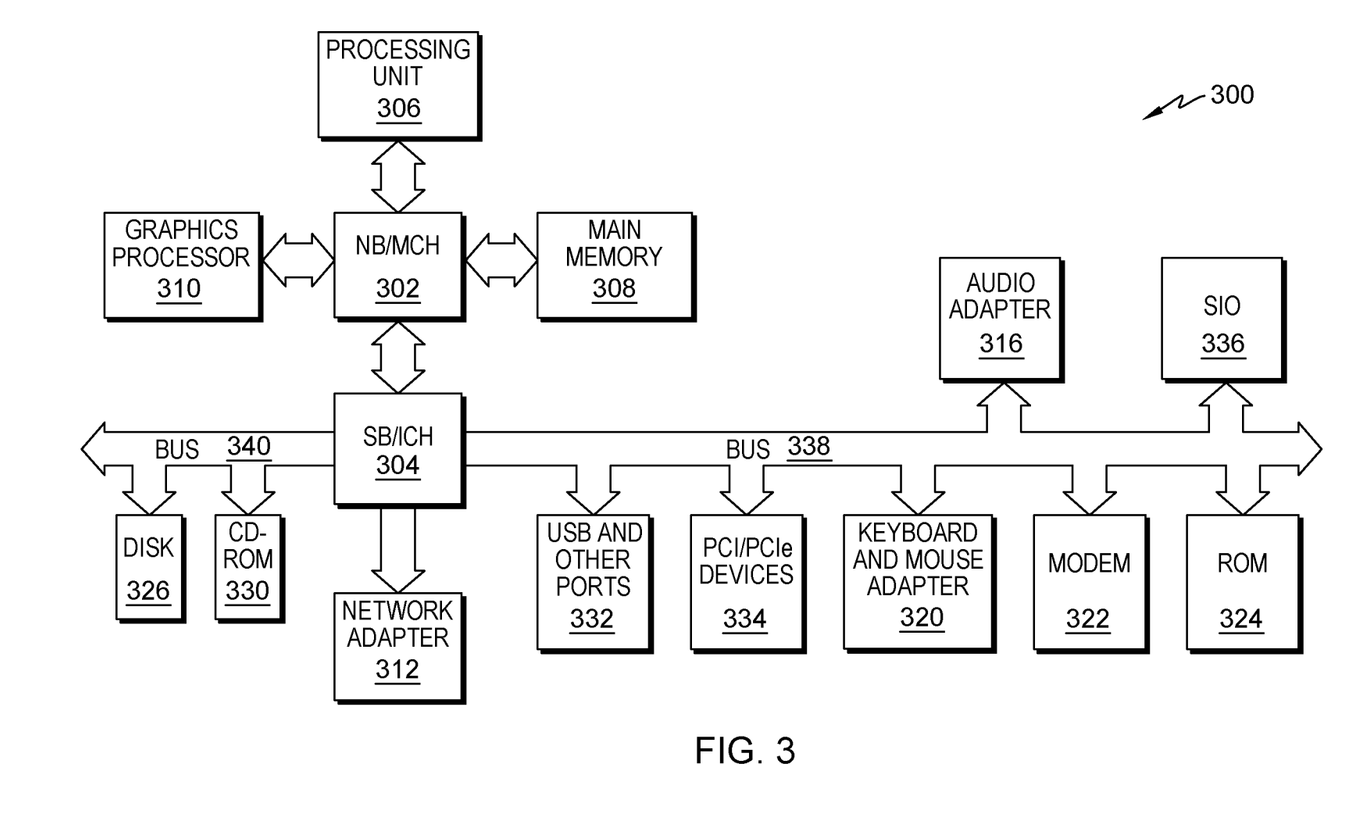
FIG. 3 is a block diagram of a data processing system which may incorporate or implement one or more aspects of the present invention.

FIG. 3 depicts one embodiment, a block diagram of a data processing system 300 which may be used to implement one or more aspects of the present invention. For instance, data processing system 300 may be one example, at least in part, of a computer system associated with the map display and/or of a user's mobile device, and may include computer usable program code or instructions implementing processes such as disclosed herein.

In the depicted example, data processing system 300 includes a hub architecture including a north bridge and memory controller hub (NB/MCH) 302 and a south bridge and input/output (I/O) controller hub (SB/ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the NB/MCH through an accelerated graphics port (AGP), for example.

In the depicted example, a local area network (LAN) adapter 312 is coupled to south bridge and I/O controller hub 304 and audio adapter 316, keyboard and mouse adapter 320, modem 322, read only memory (ROM) 324, universal serial bus (USB) and other ports 332, and PCI/PCIe devices 334 are coupled to south bridge and I/O controller hub 304 through bus 338, and hard disk drive (HDD) 326 and CD-ROM 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system, such as a Microsoft™ Windows™ system (Microsoft and Windows are trademarks of Microsoft Corporation in the United States, other countries, or both). An object oriented programming system, such as the Java™ programming system, may run in conjunction with the operating system and provide calls to the operating system from Java™ programs or applications executing on data processing system 300. (Java™ and other Java™ based trademarks are trademarks of Sun Microsystems, Inc. in the United States, other countries, or both.)

Instructions for the operating system, the object-oriented programming system, and applications or programs may be located on storage devices, such as hard disk drive 326, and may be loaded into main memory 308 for execution by processing unit 306. The processes of the illustrative aspects discussed herein may be performed by processing unit 306 using computer implemented instructions, which may be located in a memory such as, for example, main memory 308, read only memory 324, or in one or more peripheral devices.

The hardware embodiments depicted in FIG. 3 may vary depending on the desired implementation. Other internal hardware or peripheral devices, such as flash memory, equivalent non-volatile memory, or optical disk drives and the like, may be used in addition to or in place of certain hardware depicted in FIG. 3. Also, the processes of the illustrative aspects described herein may be applied to other hardware environments, such as to a multiprocessor data processing system.

In one or more implementations, data processing system 300 may be a mobile device, and be generally configured with flash memory to provide non-volatile memory for storing operating system files and/or user-generated data. A bus system may include one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs. Those skilled in the art should note that the depicted system example of FIG. 3, as well as other examples referenced herein, are not meant to imply architectural limitations. For example, as briefly noted, data processing system 300 may be implemented as part of a tablet computer, laptop computer, mobile telephone, personal digital assistant (PDA), wireless computer, vehicle navigation system, etc. and/or in association with a map display such as described herein.

Figure 4:
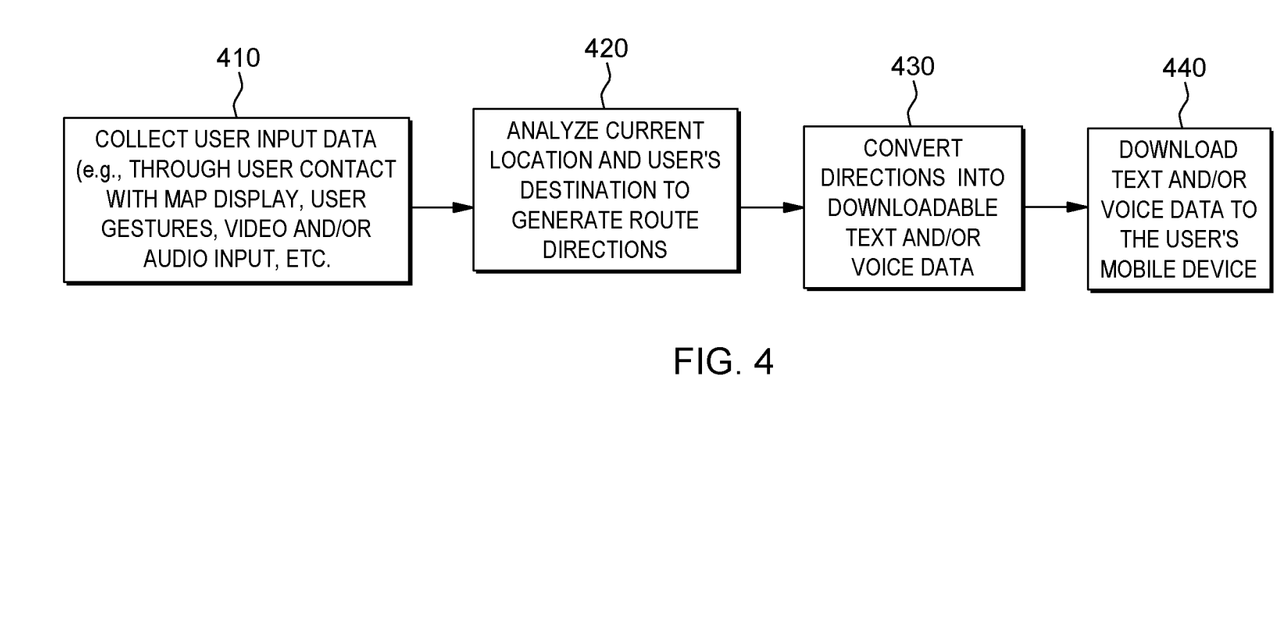
FIG. 4 depicts one embodiment of a process for collecting user input data, generating route directions and downloading text and/or voice data to a user's mobile device, in accordance with one or more aspects of the present invention.

Generally stated, provided herein are computer-implemented methods, systems and computer program products for facilitating providing directions to a user, such as when the user is standing in front of a kiosk-implemented map display. FIG. 4 depicts one embodiment of processing, in accordance with one or more aspects of the present invention. As illustrated, user input data is collected 410, for instance, through user contact with a touch screen associated with the map display, or through user gestures, or other video and/or audio input. The user input data is analyzed, along with the current location, that is, the location of the map display, to generate route directions to the user's destination 420. Note that the directions could be generated in association with a user input preferred route to take as well. The directions are converted into downloadable text and/or voice data 430, and the downloadable text and/or voice data is downloaded wireless to the user's mobile device 440. After leaving the map display, the user is then able to navigate by the downloaded text and/or voice data to reach the user's desired destination.

Advantageously, one or more aspects of the map display with associated data collection and directions generating and download facility may be integrated with or implemented within a kiosk located to allow visitors to readily access direction information for download to their mobile devices. Note in this regard that one or more aspects of the providing of directions to the user may be implemented remotely from the map display. For instance, through an Internet connection, processing of video and/or audio user input may be performed remotely, for instance, via cloud-based processing. Also note that, as explained herein, a variety of data collection modes may be provided in association with the map display to allow the user to input data. For instance, a touch screen or sensor may be employed in association with the map display so the user can input by touch, data via the map display. Further, video data input could be provided by associating a video monitor with the map display and providing a facility to interpret the user's action so as to capture for instance, hand gestures (e.g., pointing to a particular destination), facial expressions, eye gaze on the map display, etc. Further, an audio capture facility could be provided to allow the user to speak to the facility to provide a destination, as well as any route request, and if desired, a language to use in providing the directions.

By way of further example, the facility disclosed herein may detect a user's current location or have access to a pre-programmed indication of the current location of the facility (e.g., kiosk), and may detect when a user stands in front of the map display (e.g., of a street map or other location). The facility may capture, in one or more embodiments, the user's hand touch on either, for instance, braille or other locations on the display map. Further, or alternatively, the facility could detect a user's hand gesture to detect a starting point, route, and destination if desired. Still further, the facility could detect user's voice data by the user talking in the vicinity of the display map. Still further, video input data such as eye gaze on the display map could be employed, for instance, as a secondary validation to confirm a user's intended destination and/or route. Still further, facial movements could be employed by evaluating the direction the user looks on the display map as additional data points for validation. The directions generating facility analyzes all of the user input data and identifies, for instance, the current location, the user's destination, and if applicable, any route information between these two locations input by the user. Detailed directions are generated to facilitate the user in reaching the desired destination efficiently. The directions may be converted into one or both of text data format and voice data format, and then downloaded wirelessly to the user's mobile device, such as to the user's smart phone. The user may then start traveling, for instance, walking, biking, driving, towards the destination using the generated directions downloaded to the user's mobile device.

Note that the text and voice data downloaded may be generated based on the local language of the user's current location, or alternatively, the user could be presented with text and/or voice data in the language that the user requests. Also, in one or more implementations, the system can analyze the user input data and determine when or how long the directions downloaded might be valid. For instance, if there is a street fair occurring from 2-6 pm local time with many street closures, the facility may understand this information, and provide directions that are only valid until 6 pm when the fair is over. Note that the same concepts could be applied to other applications, such as pointing out the steps in a diagram and rendering the directions to a mobile device. As noted herein, mobile device refers to any transportable device capable of receiving the generated directions. Note also that, in one or more implementations, the mobile device may be a wearable device, such as Google™ glasses.

The various aspects of the computer-implemented methods, systems and computer program products described herein may be implemented using existing technologies. For instance, technologies exist for collecting user input data in a variety of modes, such as, for instance, collecting user gestures, user contact with a touch screen, user eye gaze, user facial movement, user head movement as well as audio recognition. Aspects of the data collection as well as the directions generating facility may be provided as a cloud-based service. For instance, in one or more implementations, data collection, as well as directions generating, could be facilitated using an existing cloud based service such as International Business Machines Corporation's Presence Insights™ facility. IBM Presence Insights™ is a facility that, in part, aggregates location and location related metadata to build context that can be used for analysis and resulting actions. As such, part of the value that Presence Insights™ provides is its ability to provide location information to users.

Those skilled in the art will note from the above description that provided herein are computer-implemented methods, systems and computer program products which implement, in one or more aspects, collecting at a map display user input data, where the user input data includes a user's destination. Further, a directions generating facility associated with the map display generates directions for the user to use in navigating from a current location to the user's destination, and downloads the directions to a mobile device of the user to assist the user in navigating to the user's destination after leaving the map display. In one or more embodiments, the user interfaces with a map display to facilitate the collecting at the map display of the user input data. The collecting may further include ascertaining the current location of the user, for instance, by a current location of the map display. In one or more embodiments, the user input data includes a user indicated travel route collected at the map display, and generating the directions may include using the current location, the user indicated travel route, and the user's destination to generate the directions.

In one or more embodiments, the map display may include an associated video monitor and video processing capabilities, and the collecting may include collecting, at least in part, the user input data from user gestures in relation to the map display, user eye gaze in relation to the map display, user facial movements in relation to the map display and/or user head movements in relation to the map display. In one or more embodiments, the map display may include or have an associated touch screen, and the collecting may include, at least in part, receiving the user input data through the user's contact with the touch screen. In one or more further embodiments, the map display may include an associated voice recognition system, and the collecting may include, at least in part, ascertaining the user input data as voice data input by the user.

To restate, the map display may include multiple data collection modes for the user to input the user input data. For instance, collecting user input data may include collecting data from the user using at least two data collection modes of the multiple data collection modes. In one or more embodiments, the multiple data collection modes may include, for instance, data collected via user gestures in relation to the map display, user contact with the map display, user eye gaze in relation to the map display, user facial movements in relation to the map display, user head movements in relation to the map display, audio recognition, as well as other user input data.

In one or more implementations, downloading directions may include downloading the directions in one or both of text data and voice data formats to the user's mobile device. In one or more embodiments, the map display may be associated or located at a kiosk, and the downloading may include wirelessly downloading the generated directions to the user's mobile device. As noted, a language selection facility may be associated with the directions generating facility to allow the user to select a language for the downloaded directions in text data format or voice data format. Note that although described as downloading directions in text data format or voice data format, if desired, the directions could be downloaded onto the user's mobile device for display on a map depicted on the user's mobile device, where available.

Further exemplary embodiments of a computing environment to implement one or more aspects of the present invention are described below with reference to FIGS. 5-7.

Figure 5:
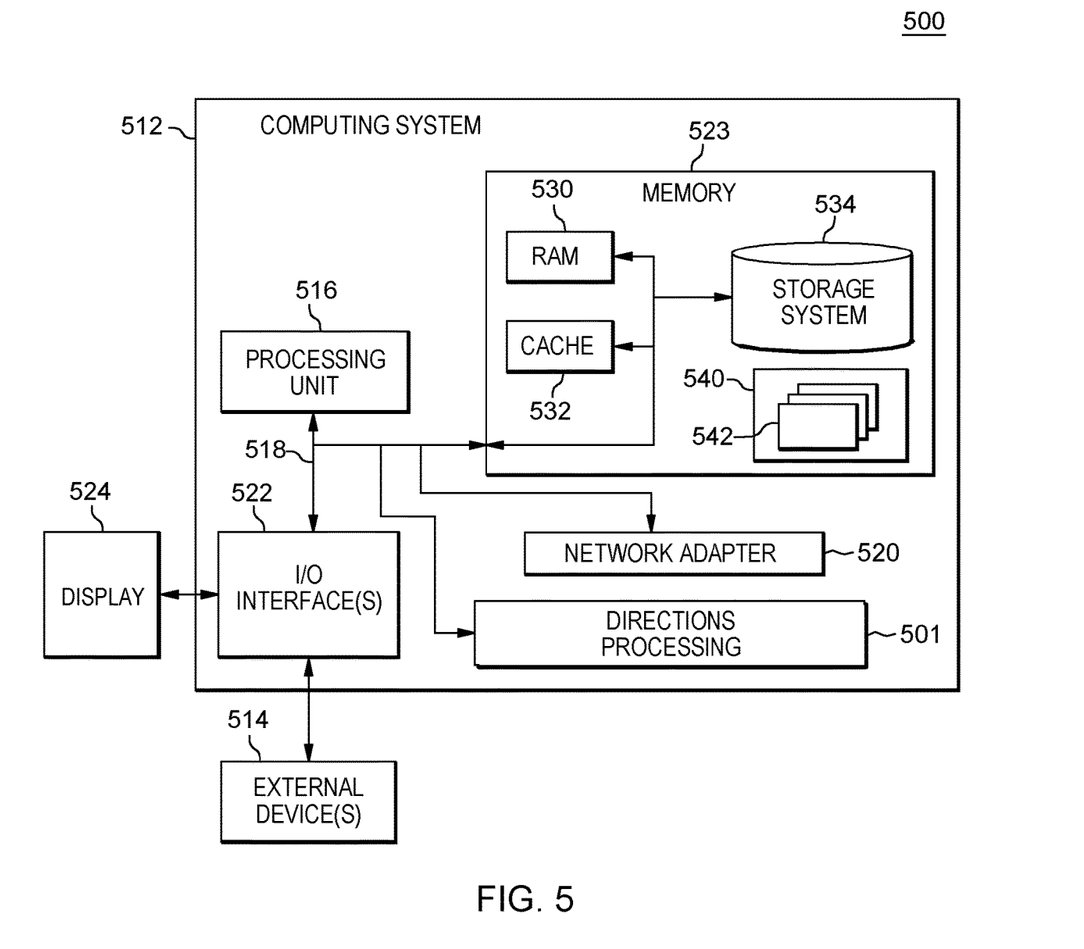
FIG. 5 depicts another embodiment of a computing system which may implement or facilitate implementing processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate directions system, module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
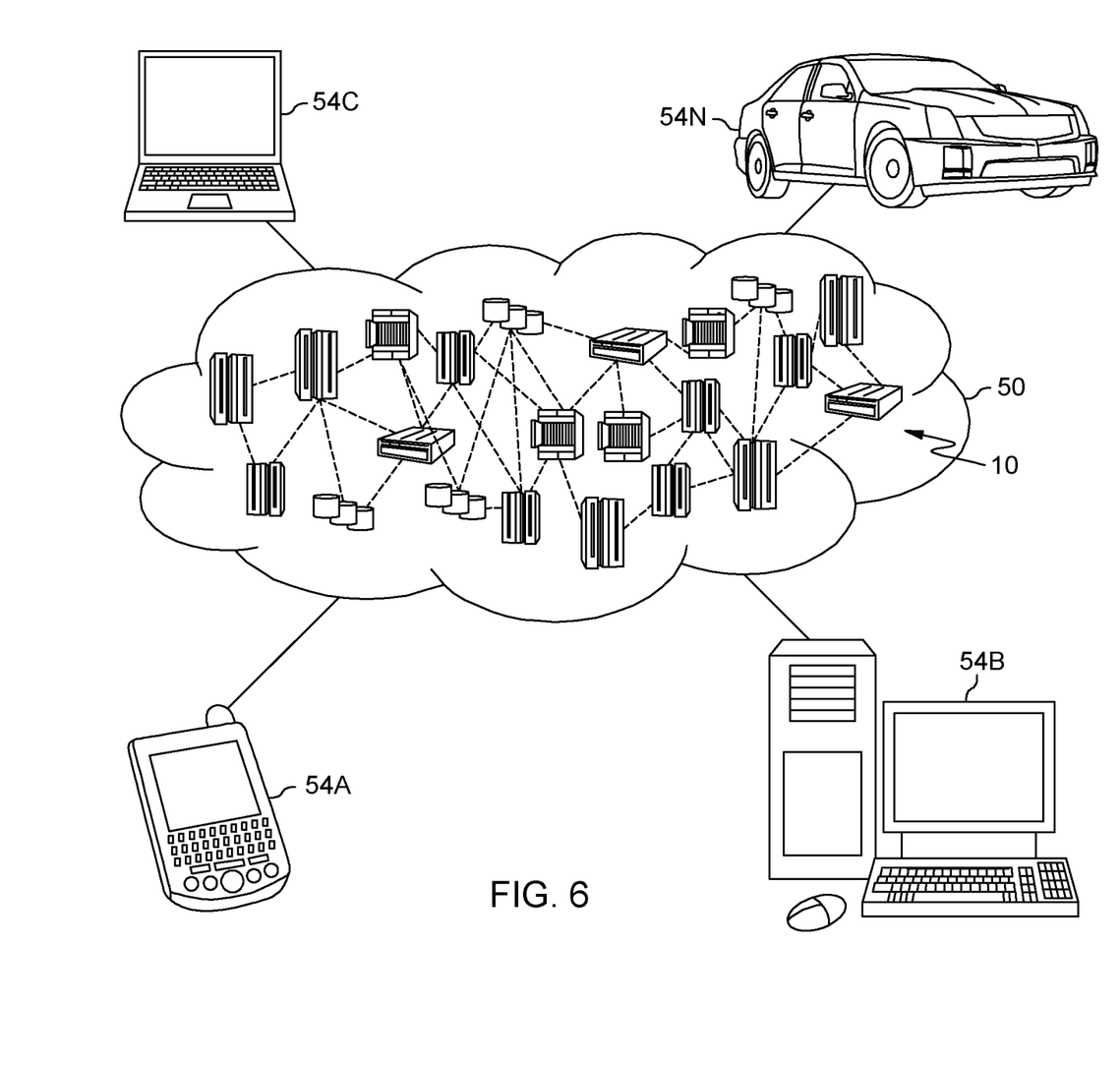
FIG. 6 depicts one embodiment of a cloud-computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
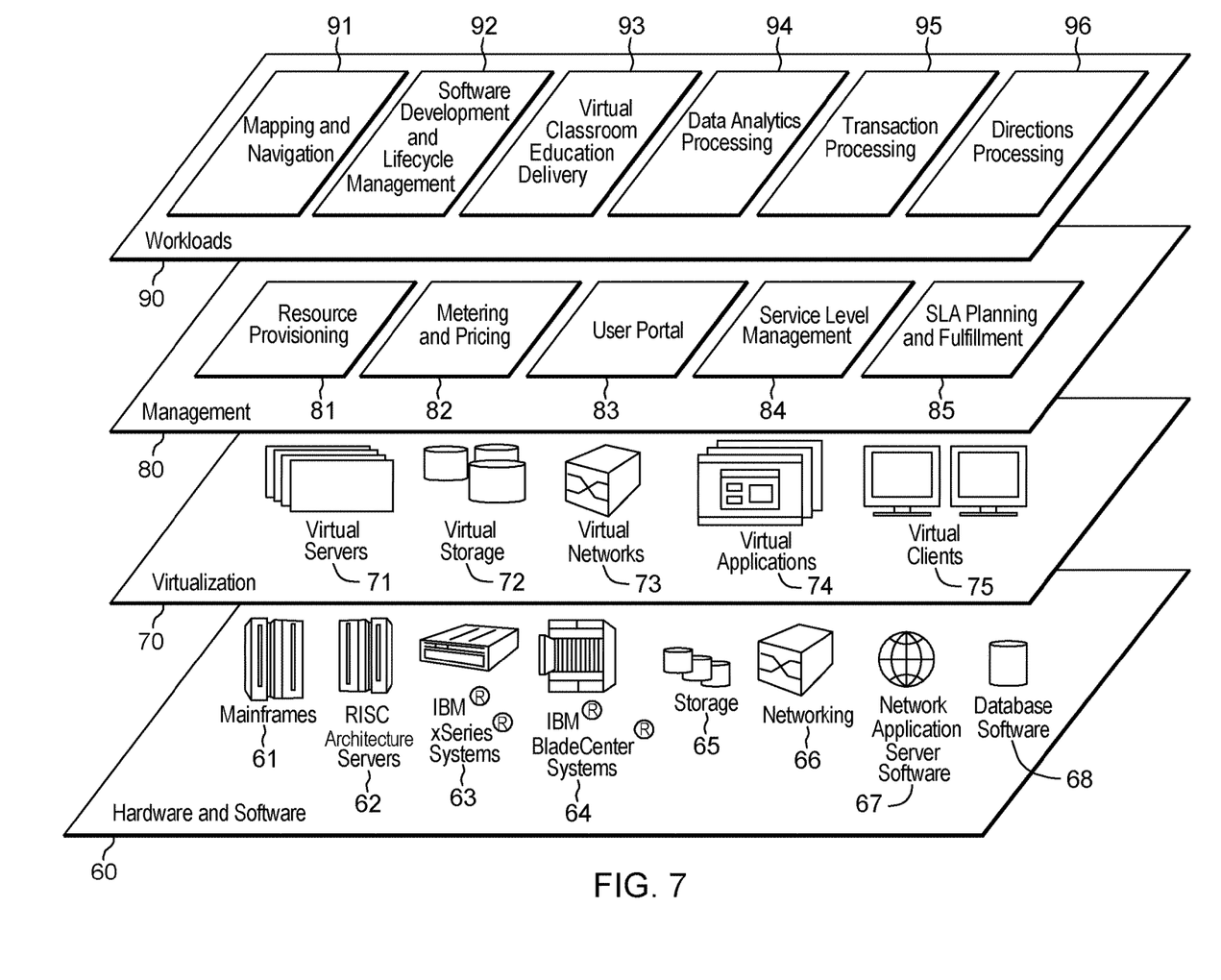
FIG. 7 depicts an example of extraction model layers, which may facilitate implementing directions processing, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and directions processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   collecting at a map display user input data, the user input data including a user's destination;
   generating, by a directions generating facility associated with the map display, directions for the user to use in navigating from a current location to the user's destination;
   downloading the directions generated by the directions generating facility to a mobile device of the user to assist the user in navigating to the user's destination after leaving the map display; and
   wherein the map display comprises multiple data collection modes for the user to input the user input data, and wherein the collecting comprises collecting the user input data using at least two data collection modes of the multiple data collection modes, wherein the multiple data collection modes include data collected via a group consisting of user gestures in relation to the map display, user contact with the map display, user eye gaze in relation to the map display, user facial movements in relation to the map display, user head movements in relation to the map display, and user voice recognition.

2. The computer-implemented method of claim 1, wherein the user interfaces with the map display to facilitate the collecting at the map display the user input data, and wherein the collecting further comprises ascertaining the current location of the user.

3. The computer-implemented method of claim 2, wherein the user input data includes a user-indicated travel route collected at the map display, and wherein the generating includes generating the directions from the current location, the user-indicated travel route, and the user's destination.

4. The computer-implemented method of claim 1, wherein the map display comprises a touch screen, and the collecting comprises, at least in part, receiving the user input data through the user's contact with the touch screen.

5. The computer-implemented method of claim 1, wherein the map display comprises an associated voice recognition system, and the collecting comprises, at least in part, ascertaining the user input data as voice data input by the user.

6. The computer-implemented method of claim 1, when the downloading comprises downloading the directions in at least one of text data format or voice data format to the user's mobile device.

7. The computer-implemented method of claim 6, wherein the map display is at a kiosk, and the downloading comprises wirelessly downloading the directions to the user's mobile device.

8. The computer-implemented method of claim 6, further comprising providing a language selection facility to allow the user to select a language of the downloaded directions in the at least one of text data format or voice data format.

9. A system for facilitating providing directions to a user, the system comprising:
   a memory; and
   a processing circuit communicatively coupled to the memory, wherein the system performs a method comprising:
   collecting at a map display user input data, the user input data including a user's destination;
   generating, by a directions generating facility associated with the map display, directions for the user to use in navigating from a current location to the user's destination;
   downloading the directions generated by the directions generating facility to a mobile device of the user to assist the user in navigating to the user's destination after leaving the map display; and
   wherein the map display comprises multiple data collection modes for the user to input the user input data, and wherein the collecting comprises collecting the user input data using at least two data collection modes of the multiple data collection modes, wherein the multiple data collection modes include data collected via a group consisting of user gestures in relation to the map display, user contact with the map display, user eye gaze in relation to the map display, user facial movements in relation to the map display, user head movements in relation to the map display, and user voice recognition.

10. The system of claim 9, wherein the user interfaces with the map display to facilitate the collecting at the map display the user input data, and wherein the collecting further comprises ascertaining the current location of the user.

11. The system of claim 10, wherein the user input data includes a user-indicated travel route collected at the map display, and wherein the generating includes generating the directions from the current location, the user-indicated travel route, and the user's destination.

12. The system of claim 9, when the downloading comprises downloading the directions in at least one of text data format or voice data format to the user's mobile device.

13. The system claim 12, wherein the map display is at a kiosk, and the downloading comprises wirelessly downloading the directions to the user's mobile device.

14. A computer program product for facilitating providing directions to a user, the computer program product comprising:
   a computer readable storage medium having computer readable program code embodied therewith, the computer readable program code being executable by a processor to perform a method comprising:
   collecting at a map display user input data, the user input data including a user's destination;
   generating, by a directions generating facility associated with the map display, directions for the user to use in navigating from a current location to the user's destination;
   downloading the directions generated by the directions generating facility to a mobile device of the user to assist the user in navigating to the user's destination after leaving the map display; and
   wherein the map display comprises multiple data collection modes for the user to input the user input data, and wherein the collecting comprises collecting the user input data using at least two data collection modes of the multiple data collection modes, wherein the multiple data collection modes include data collected via a group consisting of user gestures in relation to the map display, user contact with the map display, user eye gaze in relation to the map display, user facial movements in relation to the map display, user head movements in relation to the map display, and user voice recognition.

15. The computer program product of claim 14, wherein the user interfaces with the map display to facilitate the collecting at the map display of the user input data, the collecting including ascertaining the current location of the user, and wherein the user input data includes a user indicated travel route collected at the map display, and the generating includes generating the directions from the current location, the user indicated travel route, and the user's destination.

16. The computer program product of claim 14, wherein the map display is at a kiosk, and the downloading comprises wirelessly downloading the directions in at least one of text data format or voice data format to the user's mobile device.

* * * * *